United States Patent [19]
Weichbrodt et al.

[11] 3,798,626
[45] Mar. 19, 1974

[54] FOREIGN OBJECT IMPACT DETECTION IN MULTI-BLADED FLUID ENGINES

[75] Inventors: Bjorn Weichbrodt; Bernard Darrel, both of Schenectady, N.Y.

[73] Assignee: General Electric Company, Schenectady, N.Y.

[22] Filed: Feb. 28, 1972

[21] Appl. No.: 229,670

Related U.S. Application Data

[63] Continuation of Ser. No. 50,554, June 29, 1970, abandoned.

[52] U.S. Cl............... 340/267 R, 73/71.4, 340/261
[51] Int. Cl. ............................................ G08b 21/00
[58] Field of Search........... 340/261, 267 R; 73/71.4

[56] References Cited
UNITED STATES PATENTS

| | | | |
|---|---|---|---|
| 2,796,600 | 6/1957 | Church | 340/261 |
| 3,095,730 | 7/1963 | Matheson | 340/261 X |
| 3,201,776 | 8/1965 | Morrow et al. | 340/261 |

Primary Examiner—David L. Trafton
Attorney, Agent, or Firm—Donald R. Campbell; Joseph T. Cohen; Julius J. Zaskalicky

[57] ABSTRACT

Vibrations generated by objects impacting on the blades of the rotor of the engine are sensed by an accelerometer located on the rotor bearing mount. A peak detection circuit with a suitable decay time constant is provided for detection of the peaks in the signal from the accelerometer corresponding to peaks in the vibrations from the rotor. A level detection circuit is provided responsive to a predetermined level of the detected signal to actuate suitable indication means such as an alarm.

6 Claims, 5 Drawing Figures

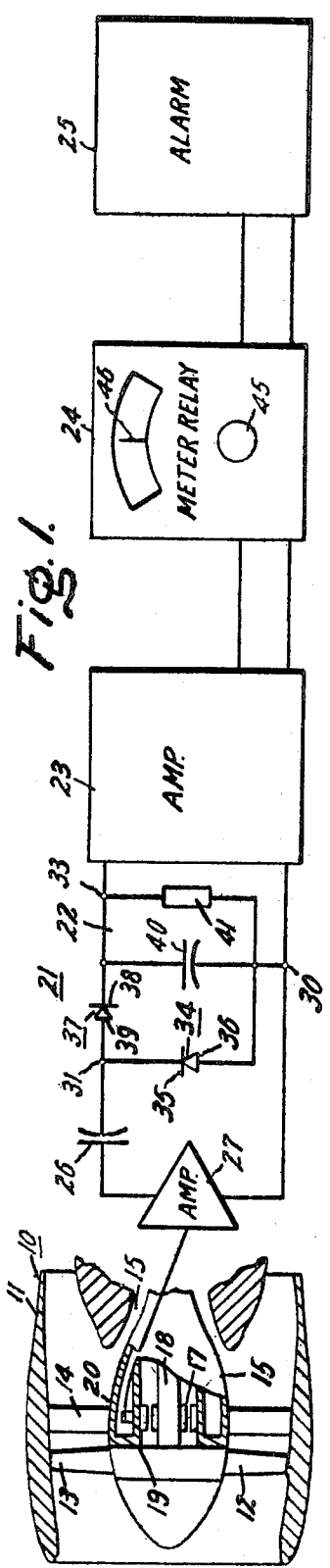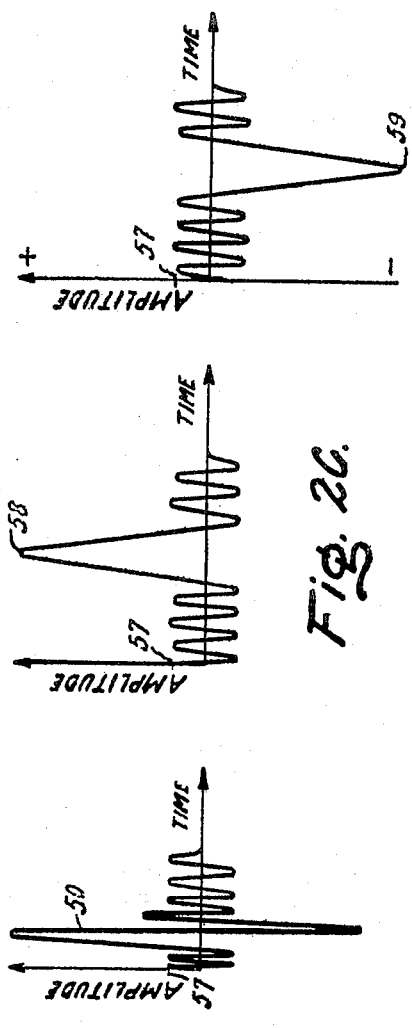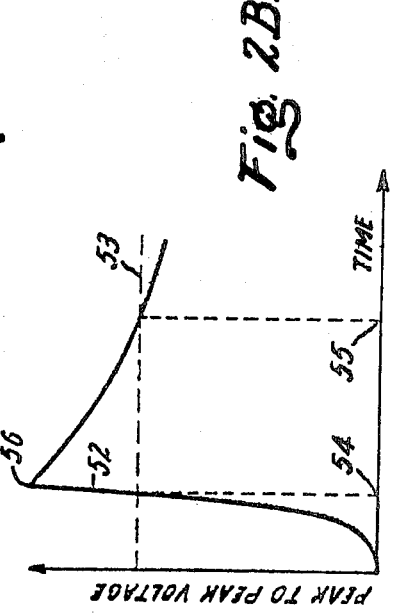

FOREIGN OBJECT IMPACT DETECTION IN MULTI-BLADED FLUID ENGINES

This is a continuation, of application Ser. No. 50,554, filed June 29, 1970, now abandoned.

The present invention relates to impact detection and in particular relates to apparatus for the detection of impacts produced by moving objects in multi-bladed fluid engines such as the compressors of jet engines.

Foreign objects such as birds, ice balls, and the like and also internally originated free objects such as compressor blades or parts of blades can damage the internal components of the engine in flight or on the ground under certain circumstances. Accordingly, it is desirable to know when a large object has hit parts of the engine so that the engine can be shut down to prevent secondary damage and catastrophic failure.

The present invention is directed to providing simple and reliable apparatus for detecting damage in fluid engines produced by foreign and internally originated objects.

A particular object of the present invention is to provide apparatus for continuously monitoring a fluid engine, such as the jet engine of an aircraft to detect damage to the components thereof produced by objects moving in the flow stream of the engine.

Another object of the present invention is to provide an improved system for providing an indication of foreign or free object damage to a fluid engine.

The novel features which are believed to be characteristic of the present invention are set forth in the appended claims. The invention itself, however, together with further objects and advantages thereof may best be understood by reference to the following description taken in connection with the accompanying drawings wherein:

FIG. 1 is a diagram of a system for the detection of damage to a fluid engine in accordance with the present invention.

FIGS. 2A, 2B, 2C and 2D are diagrams of the waveforms of vibrations of various kinds useful in explaining the operation of the system of FIG. 1.

In carrying out the present invention in accordance with one illustrative embodiment thereof there is provided an accelerometer mounted on the stator of the engine near the rotor bearing support thereof for sensing vibrations produced by objects impacting on the rotor and for developing an electrical output in accordance with such vibrations. A peak detection means is also provided having an input circuit coupled to the output of the accelerometer and having an output circuit including a network of resistance and capacitance in parallel across which appears a unidirectional signal having peak values in accordance with the peaks of the electrical output of the accelerometer. The unidirectional signal decays from its peak value at a rate determined by the time constant of the network. A means is provided responsive to levels of the unidirectional signal greater than a predetermined value corresponding to an impact of a predetermined magnitude for providing an indication of the impact.

We have found that a foreign object of significant size such as a bird or an ice ball generates a sharp mechanical impact when it hits the rotating blades of a fluid engine such as a jet engine. If such foreign object penetrates into the compressor of the engine, several impacts may occur in rapid sequence. Such impacts are of such magnitude that they exceed the normal engine noise and can be sensed with a sensitive vibration sensing device such as an accelerometer. Preferably the sensing device is located on the stator close to the rotor bearing mount of the jet engine.

Reference is now made particularly to FIG. 1 which shows in section a portion of a turbofan engine 10 which comprises a cowl or fan shroud 11 within which a fan rotor 12 is housed. The fan rotor has a plurality of radially projecting blades 13, only two of which are shown, which pressures air entering at the cowl inlet. The pressurized air is turned to an axial flow direction by outlet guide vanes 14. A portion of the pressurized air enters a core engine inlet 15 and supports combustion of fuel in generating a hot gas stream which powers the fan rotor 12 for rotation. The cowl 11 with the stationary engine frame 16 constitute the stator of a compressor. Also shown in FIG. 1 is a shaft 17 connected to the rotor 12 and supported by thrust bearing 18. The bearing 18 has balls rotatably supported in the inner and outer races thereof. The bearing 18 is mounted on the stator support structure 19 within the stationary engine frame 16. The detection system in accordance with the present invention includes an accelerometer 20 which is mounted on the stator support structure 19 adjacent the bearing 18. The detection system also includes an amplifier 27 for amplifying the signal from the accelerometer 20, peak detection circuits 21 including a time constant network 22, an amplifier 23 for amplifying the output of the peak detection circuits and providing the output for driving a meter relay device 24 which in turn actuates a suitable indication means 25, such as an alarm. The accelerometer 20 converts mechanical or sonic vibrations into electrical signals in which the amplitude of the signal varies in accordance with the acceleration component of the mechanical or sonic vibrations. Such a device is particularly useful in applicant's system in that it senses the high frequency components as well as the low frequency components of vibration of an impact thereby providing high fidelity of response to steep wavefronts such as produced by impacts of foreign objects on the blades of the engine. The accelerometer 20 mounted on the stator 11 close to the rotor bearing 18 of the engine produces good response to impacts on the rotor blades as well as the stator blades.

The peak detection circuit includes an input terminal 30 and a common input-output terminal 31 and an output terminal 33. The peak detection circuit also includes a unilaterally conducting device 34 having a cathode 35 and an anode 36 and another unilaterally device 37 having a cathode 38 and an anode 39. The electrical output of the amplifier 27 is coupled through a coupling capacitor 26 to the input terminals 30 and 31 of the peak detection circuit 21. The anode 36 is connected to the input terminal 30 and the cathode 35 is connected to the input terminal 31. The anode 39 is also connected to the input terminal 31 and the cathode 38 is connected to the output terminal 33. A capacitor 40 and a resistance 41 are connected in parallel between the output terminals 30 and 33. An alternating voltage applied to the input terminals 30 and 31 of the peak detection circuit 21 is rectified and the peak-to-peak voltage appears across the output terminals 30 and 33 thereof. The peak voltage appearing across the terminals 30 and 33 decays in amplitude in accordance with the time constant of the network 22 including the resistor 41 and capacitor 40. The peak detection circuit 21 described is commonly referred to in the rectifier art as a voltage doubler.

The unidirectional signal output appearing across the output terminals 30 and 33 is amplified by conventional d-c amplifier 23. The amplifier 23 has preferably a high input impedance so that the time constant of the peak detection circuit 21 is minimally affected by the input impedance of the amplifier. The amplifier also has a low output impedance so that it can drive the meter elements of the meter relay 24 which are of low impedance. The meter relay may be any of a variety of such devices commonly available which are responsive to a given level of input for actuation of a pair of contacts. The closure of such contacts are utilized to actuate an alarm 25 to provide an indication that a particular level of input has been applied to the meter relay. In this device the knob 45 on the meter relay sets the marker 46 on the face of the meter relay to a desired level. When the input signal causes the meter element of the relay to be aligned or exceed the level represented by the marker, the contacts of the relay are actuated without loading the input circuit of the meter relay to affect operation of external apparatus such as an alarm.

Referring now to FIG. 2A, there is shown a diagram of a vibration 50 produced by the fluid engine and sensed by the accelerometer 20. The ordinate on the diagram 20 represents voltage amplitude and the abscissa represents time. The impact producing the vibration was of such character that it produced an oscillation extending in both positive and negative directions from the base line. Such output from the accelerometer applied to the voltage doubler circuit 21 causes a d-c or unidirectional voltage to appear across the output terminals of the character indicated in FIG. 2B in which the amplitude of the unidirectional signal 52 is substantially the peak-to-peak amplitude of the signal 50 of FIG. 2A. Such signal decays at a predetermined rate as determined by the time constant of the network 22, as indicated. The time constant of the network 22 is set so that the decay is sufficiently slow to permit actuation of the alarm 25 by the meter relay 24. As shown in FIG. 2B, the dotted line 53 indicates the level to which the meter relay 24 is set to be actuated by the unidirectional signal. Time represented by distance along the abscissa from point 54 to point 55 should be greater than the time delay in the transmission of signal through the amplifier 23 and the elements of the meter relay 24. Accordingly, the meter relay set for actuation of the level 53 would provide an indication of a peak of the amplitude 56. In FIG. 2A background engine noise is represented by vibrations of amplitude level 57 or peak-to-peak amplitude of twice level 57.

FIGS. 2C and 2D show other possible forms of mechanical vibration, in which the peak thereof extends in essentially one direction from the base line thereof. The peak detection circuit of the system provides a reliable indication of the occurrence of such peaks as well. The voltage doubler circuit 21 shown performs such a versatile detection function in the system in accordance with the present invention. The peaks 58 and 59 of the unidirectional voltage in the vibrations of FIGS. 2C and 2D would correspond to essentially the peaks of the signal above and below the base lines thereof, respectively. As in FIG. 2A, amplitude of engine background noise is indicated as of substantially level 57.

While an accelerometer is used in the system described a velocity pick-up device in which the electrical signal is proportional to the velocity component of the vibration would work. However, an accelerometer provides a more sensitive indication and a much better high frequency response. Accordingly, an accelerometer is much more suitable for detection impacts than a velocity pick-up device.

In certain circumstances, it may be desirable to filter out the low frequency noises from the engine which do not contain information about the impacts due to foreign and free objects. In such case a high pass filter could be located between the accelerometer and the input to the peak detection circuit.

While the invention has been described in a specific embodiment, it will be appreciated that modifications may be made by those skilled in the art and we intend by the appended claims to cover all such modifications as fall within the true spirit and scope of the invention.

What we claim as new and desire to secure by Letters Patent of the United States is:

1. The combination comprising
   a fluid engine having a multi-bladed stator and bearing means for rotatably mounting therein a multi-bladed rotor,
   an accelerometer mounted on said stator adjacent said bearing means for sensing sonic frequency vibrations produced by normal engine operation and by the impact of a free object on said rotor blades, said accelerometer generating an electrical signal in accordance with said vibrations including a low amplitude signal indicative of the normal engine operation and a substantially greater amplitude signal indicative of at least a single impact of the free object on said rotor blades,
   peak detection circuit means coupled to said accelerometer for detecting the peak value of said object impact signal and for producing a slowly decaying output signal representative thereof, and
   indication means actuated by said peak detection circuit means for providing an indication of said object impact.

2. The combination as defined in claim 1 wherein said bearing means is a thrust bearing, and said multi-bladed rotor has a shaft extending through said thrust bearing.

3. The combination as defined in claim 1 wherein said peak detection circuit means is comprised by a parallel capacitor-resistor network having a time constant sufficiently long to enable said indication means to become operative.

4. The combination as defined in claim 3 wherein said peak detection circuit means is a voltage doubler circuit also comprised by a diode rectifier network connected across said capacitor that is conductive for either polarity of said object impact signal.

5. The combination comprising
   a fluid engine having a multi-bladed stator supporting a thrust bearing in which is mounted the shaft of a multi-bladed rotor,
   an accelerometer mounted on said stator adjacent said thrust bearing for sensing sonic frequency vibrations produced by normal engine operation and by the impact of a free object on said rotor blades, said accelerometer generating an electrical signal in accordance with said vibrations including a low amplitude signal indicative of the normal engine operation and a steeply rising, substantially greater amplitude signal indicative of at least a single impact of the free object on said rotor blades, peak detection circuit means coupled to the output of said accelerometer comprising a diode network for rectifying said accelerometer signal and a parallel capacitor-resistor network for producing a slowly decaying unidirectional output signal representative of the peak value of said object impact signal, and indication means actuated by said peak detection circuit means for providing an indication of said object impact.

6. The combination as defined by claim 5 wherein said parallel capacitor-resistor network has a time constant sufficiently long to enable said indication means to become operative, and a high input impedance amplifier connected between said parallel capacitor-resistor network and said indication means.

* * * * *